US008788395B2

(12) United States Patent
Ginsberg

(10) Patent No.: US 8,788,395 B2
(45) Date of Patent: Jul. 22, 2014

(54) TRADING OF ILLIQUID GOODS, SERVICES, INSTRUMENTS OR COMMODITIES

(75) Inventor: Philip Myron Ginsberg, Newport Coast, CA (US)

(73) Assignee: CFPH, LLC, New York, NY (US)

( * ) Notice: Subject to any disclaimer, the term of this patent is extended or adjusted under 35 U.S.C. 154(b) by 1987 days.

(21) Appl. No.: 11/677,232

(22) Filed: Feb. 21, 2007

(65) Prior Publication Data

US 2007/0260559 A1     Nov. 8, 2007

Related U.S. Application Data

(60) Provisional application No. 60/775,510, filed on Feb. 21, 2006.

(51) Int. Cl.
*G06Q 40/00*     (2012.01)

(52) U.S. Cl.
USPC .............................. 705/37; 705/36 R; 705/35

(58) Field of Classification Search
USPC ........................................... 705/35, 37, 36 R
See application file for complete search history.

(56) References Cited

U.S. PATENT DOCUMENTS

| | | | |
|---|---|---|---|
| 4,799,156 A | 1/1989 | Shavit | |
| 5,136,501 A | 8/1992 | Silverman | |
| 5,168,446 A | 12/1992 | Wiseman | |
| 5,195,031 A | 3/1993 | Ordish | |
| 5,924,082 A | 7/1999 | Silverman | |
| 6,278,982 B1 | 8/2001 | Korhammer et al. | |
| 2002/0161693 A1* | 10/2002 | Greenwald | 705/37 |
| 2003/0065598 A1 | 4/2003 | Bunda | |
| 2004/0117289 A1* | 6/2004 | McNealy et al. | 705/37 |
| 2004/0210511 A1 | 10/2004 | Waelbroeck et al. | |
| 2006/0031156 A1 | 2/2006 | Noviello et al. | |

FOREIGN PATENT DOCUMENTS

| | | |
|---|---|---|
| EP | 0 512 702 A2 | 11/1992 |
| EP | 0 434 224 B1 | 4/1999 |
| GB | 1 489 571 | 10/1977 |
| JP | 2001-344421 | 12/2001 |
| JP | 2002-148981 | 5/2002 |
| JP | 2002-222316 | 8/2002 |
| JP | 2002-329066 | 11/2002 |
| JP | 2002-366761 | 12/2002 |
| JP | 2004-005554 | 1/2004 |
| JP | 2004-171550 | 6/2004 |
| JP | 2004-220601 | 8/2004 |
| JP | 2004-528658 | 9/2004 |
| JP | 2004-287819 | 10/2004 |
| WO | WO 02/097589 | 12/2002 |

OTHER PUBLICATIONS

Notification of Transmittal of the International Search Report and Written Opinion for International Application No. PCT/US07/62484, mailed Oct. 18, 2007 (6 pages).

(Continued)

*Primary Examiner* — Ojo Oyebisi

(57) ABSTRACT

Traders are notified of a computed tradeable price for an object of commerce. The computed tradeable price is calculated by a computer in conformance to a standard published to traders in a market for the object of commerce. The standard specifies rules for calculating the tradeable price based on orders received or trades executed in the market. Based at least in part on the computed tradeable price, trades are executed or negotiated, or negotiating offers are exchanged among the traders.

21 Claims, 3 Drawing Sheets

(56) References Cited

OTHER PUBLICATIONS

International Preliminary Report on Patentability for International Application No. PCT/US07/62484, mailed Aug. 26, 2008 (4 pages).
Australian Examiner's Report for Application No. 2007216995, dated Nov. 19, 2009 (2 pages).
European Communication and Supplementary Search Report for Application No. 07757263.4, mailed Apr. 26, 2011 (6 pages).
Japanese Office Action with English translation for Application No. 2008-556521, mailed Aug. 23, 2011 (9 pages).
Money Match Functional Specification (Aug. 1990) and Statement of Grounds from Opposition to EP 0 625 275 (Jan. 16, 1998).
"Notice to Members: Amendment to NYMEX Rule 6.51, Settlement Price Committee", New York Mercantile Exchange, (http://www.nymex.com/notice_to_member.aspx?id=ntm360&archive=2003), Sep. 17, 2003.
"Market Exchanges Information", Metalprices.com, (http://www.metalprices.com/GeneralInfo/Exchanges.asp), download date: Feb. 20, 2007.
Mendelson, Morris, "From Automated Quotes to Automated Trading: Restructuring the Stock Market in the U.S.", The Institute of Finance of the Schools of Business of New York University, Mar. 1972, Bulletins No. 80-82.
Australian Examiner's Report for Application No. 2011213741, dated Jun. 27, 2012 (3 pages).
Australian Notice of Acceptance for Application No. 2011213741, dated Oct. 2, 2012 (6 pages).
Australian Examiner's Report for Application No. 2013200158, dated Apr. 10, 2014 (3 pages).
Canadian Examination Report for Application No. 2,643,302, dated Jan. 15, 2014 (3 pages).
Japanese Office Action with English translation for Application No. 2008-556521, mailed Jun. 19, 2012 (12 pages).
Japanese Office Action with English translation for Application No. 2008-556521, mailed Feb. 19, 2013 (4 pages).
Japanese Office Action with English translation for Application No. 2008-556521, mailed Sep. 24, 2013 (6 pages).

* cited by examiner

TRADING OF ILLIQUID GOODS, SERVICES, INSTRUMENTS OR COMMODITIES

This application claims priority from U.S. provisional application Ser. No. 60/775,510, filed Feb. 21, 2006, which is incorporated by reference.

This application relates to electronic negotiation.

DESCRIPTION

Figure 1:
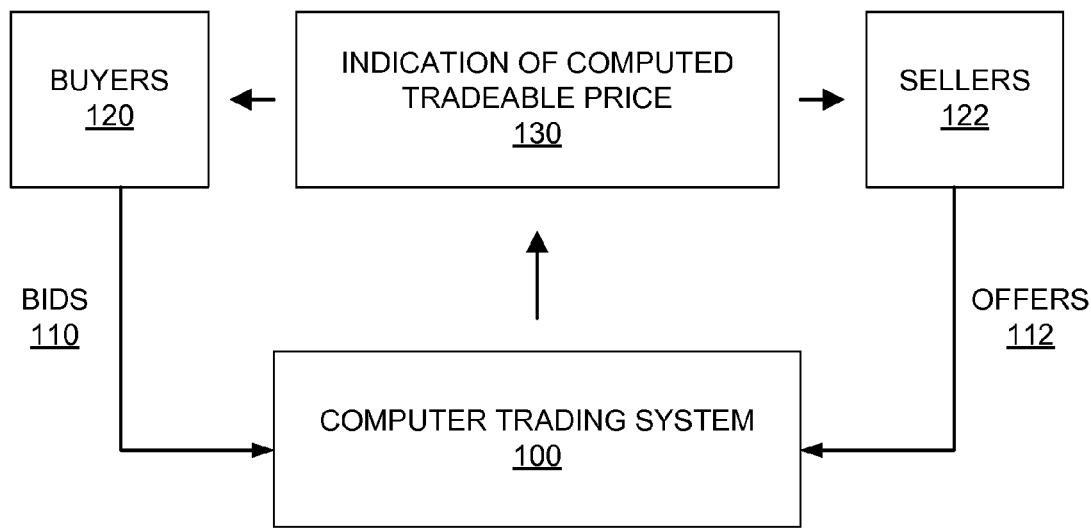
FIG. 1 is a block diagram of an electronic trading system.

The following sections I-X provide a guide to interpreting the present application.

Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

Continuing Applications

The present disclosure provides, to one of ordinary skill in the art, an enabling description of several embodiments and/or or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

35 U.S.C. §112, paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

Incorporation By Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Embodiments

In known electronic trading systems, a trader who wishes to sell goods or services, such as financial instruments, commodities, or any other object of commerce enters an order, often called an "offer." A trader who wishes to buy may enter another order, often called a "bid." Some trading systems attempt to locate matching bids and offers based on price, quantity, and possibly other information relating to the orders entered into the system by the traders, and execute those matching orders against each other. A match may also occur when the system displays existing orders to a trader, and the trader selects one or more of the displayed orders to trade against (called "hitting" a bid or "taking" an offer).

In general, in a first aspect of the invention, traders are notified of a computed tradeable price for an object of commerce. The computed tradeable price is calculated by a computer in conformance to a standard published to traders in a market for the object of commerce. The standard specifies rules for calculating the tradeable price based on orders received or trades executed in the market. Based at least in part on the computed tradeable price, trades are executed or negotiated, or negotiating offers are exchanged among the traders.

Embodiments of the invention may include one or more of the following features. Trades may be automatically executed at the computed tradeable price, without further confirmation from a trader who entered one of the orders involved in the trade, even though the order was entered at a price other than the computed tradeable price. A discretion price may be accepted from a trader for an order. A trade may be automatically executed without confirmation after ascertaining that the computed tradeable price is within the discretion price entered by the trader. Confirmation may be obtained based on a determination that the computed tradeable price is within the discretion price entered by the trader but different than the computed tradeable price. Before executing an order, the system may obtain confirmation from a trader who entered one of the orders involved in a trade to be executed, the order having a price other than the computed tradeable price. Traders may be invited to negotiate based at least in part on the computed tradeable price, without binding trades to occur at the computed tradeable price. Notification of traders of the computed tradeable price occurs after a close of regular trading. Execution and/or negotiating of trades, or receiving negotiating offers, may occur during an extended trading period defined by published rule. Notification of traders of the computed tradeable price may occur from time to time during regular trading hours. The computed tradeable price may be based at least in part on entry times of orders on which the calculation is based. The calculation of computed tradeable price may be based at least in part on an execution price of at least one executed trade. The computed tradeable price may be based at least in part on price of pending orders, without regard to execution price of any executed trade. The object of commerce may be defined ad hoc by a trader in the market.

System Overview

Figure 2:
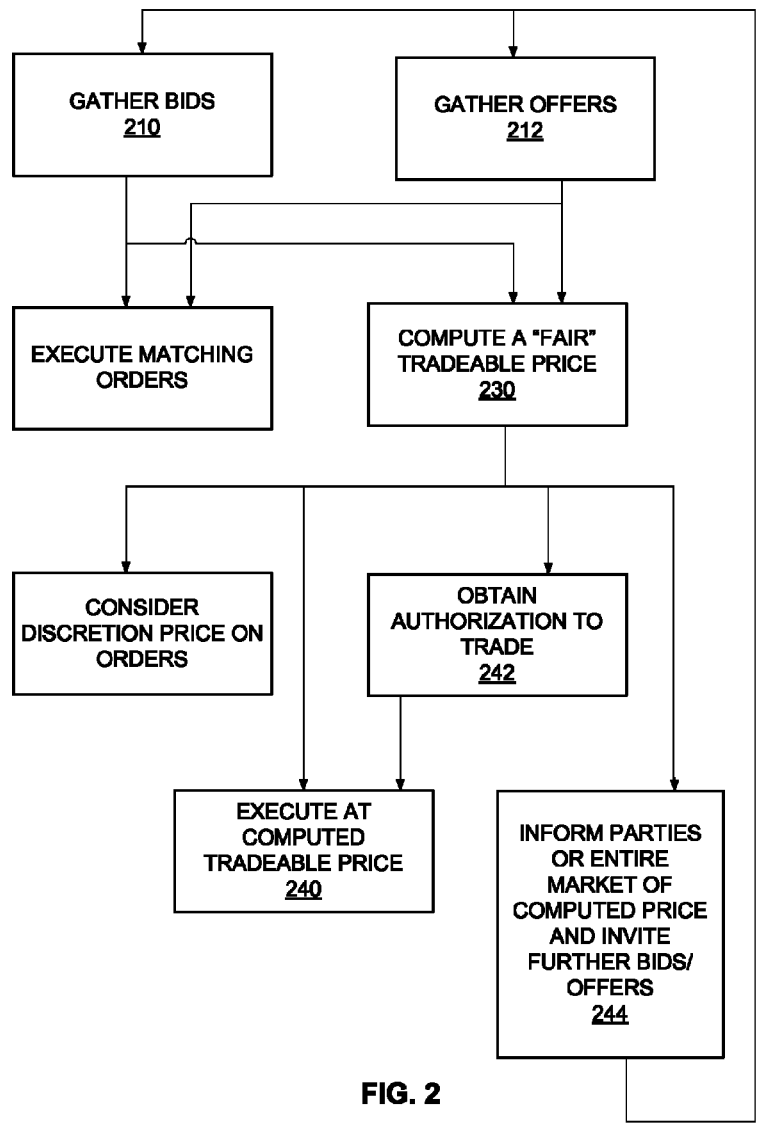
FIG. 2 is a flowchart of an electronic trading system.

Referring to FIGS. 1 and 2, electronic trading system 100 may receive bids and offers 120, 122, 220, 222 from buyers and sellers 120, 122 who wish to buy or sell goods or services, such as financial instruments, commodities, or any other object of commerce. In some cases where the highest bid 110 to buy is lower than the lowest offer 112 to sell a particular good or service (e.g., because some orders remain unfilled after other orders are matched, or because no matching orders were received during a trading session), trading system 100 may compute 230 a tradable price 130 that is intended to be fair to both the bidders 120 and offerors 122. The calculation 230 by which tradeable price 130 is calculated may be disclosed in advance to traders 120, 122. Electronic trading system 100 may then attempt to encourage execution of unexecuted orders by one or more techniques, for example:

(a) automatically executing 240 some portion of bids 110 against offers 112 at computed tradeable price 130, (b) executing orders 110, 112 that were entered into trading system 100 only for conditional execution during a period of the trading session reserved for conditional orders and computed tradeable price 130, (c) informing traders 120, 122 of computed tradeable price 130 and requesting 242 consent to modify their unexecuted orders to computed tradeable price 130, and executing 240 such orders as are so modified, (d) inviting 244 traders 120, 122 to negotiate further, with computed tradeable price 130 as a suggested mediated price, (e) publishing 244 computed tradeable price 130 to trading system 100 for some period of time to invite orders that might execute at or near computed tradeable price 130, or (f) otherwise making arrangements or host negotiations to lead to execution of the unexecuted orders.

Orders

Orders 110, 112 may be received by electronic trading system 100 by electronic entry, for example at a web page or at a computer screen of a specialized trading system over a proprietary network, or may be received by postal mail or other written means, by telephone, from a personal digital assistant (PDA), a specialized trading handheld device, a smart phone, a secure credit card with some communications link, or any other communications channel, electronic or non-electronic. Communications channels may be secure, encrypted, or clear.

An order may be entered with a "discretion" limit price. For bids, a "discretion" price is a price higher than the price that is shown to the market, but that the system is to consider when matching offers; for offers, a "discretion" price is a price lower than the price that is shown to the market, but that the system may consider when matching bids. Electronic trading system 100 may permit a trader to set this discretion price in one or more of several ways:

(a) at a fixed dollar value,
(b) pegged at a certain dollar value above or below the visible price or last trade price,
(c) as a portion of the gap between the highest bid and lowest offer, or
(d) another calculation.

When electronic trading system 100 computes tradeable price 130, electronic trading system 100 may match 250 those orders whose discretion price meets computed tradeable price 130, and execute those trades, perhaps with confirmation 242, as specified by trading rules of trading system 100 or by trader 110, 112.

In some cases, trading system 100 may have a defined contract that is traded—for example, a swap on a particular financial instrument with defined near-leg and far-leg settlement dates, defined interest-rate discounting, etc. In other case, trading system 100 may permit offerors 122, or perhaps bidders 120, to define the particular object of commerce to which their order relates, with sufficient specification to permit at least partial matching by computer when a prospective counterparty seeks that type of object.

Calculation of Tradeable Price

From time to time, electronic trading system 100 may compute 230 tradeable price 130. The calculation may occur on a fixed schedule—for example hourly, or at the close of each trading day or week. In other cases, trading system 100 may compute 230 tradeable price 130 more or less continuously, for example, as each order 110, 112 is received.

Tradeable price calculations 230 used to calculate tradeable price 130 may vary from simple to complex. Simple calculations 230 may consider only a few factors; complex calculations 230 may consider many factors including the entry or arrival time of orders, customer type, order size, order type, and fees paid for order options, prices at which trades were executed during a selected time window, for example during the latest trading session in which trades occurred, or during the last month, or during a short period (e.g., fifteen minutes) at the close of a trading session. The weighting given respective factors may vary depending on market factors—for example, in some markets it may be desirable to give greater weighting to earlier orders in order to encourage prompt entry of orders, while in other markets it may be desirable to give greater weighting to later orders because they may be better representatives of the current state of the market. In some cases, there may be a market for a related good or service, and orders or executed trades on that market may be factored in. For example, if electronic trading system 100 operates a market for freight futures, a rapid market change in spot freight rates may influence the weighting of orders in calculating a tradeable price 130. A few representative examples follow.

Tradeable price 130 may be calculated as the midpoint between the highest bid and lowest offer, or as the last trade price.

Figure 3:
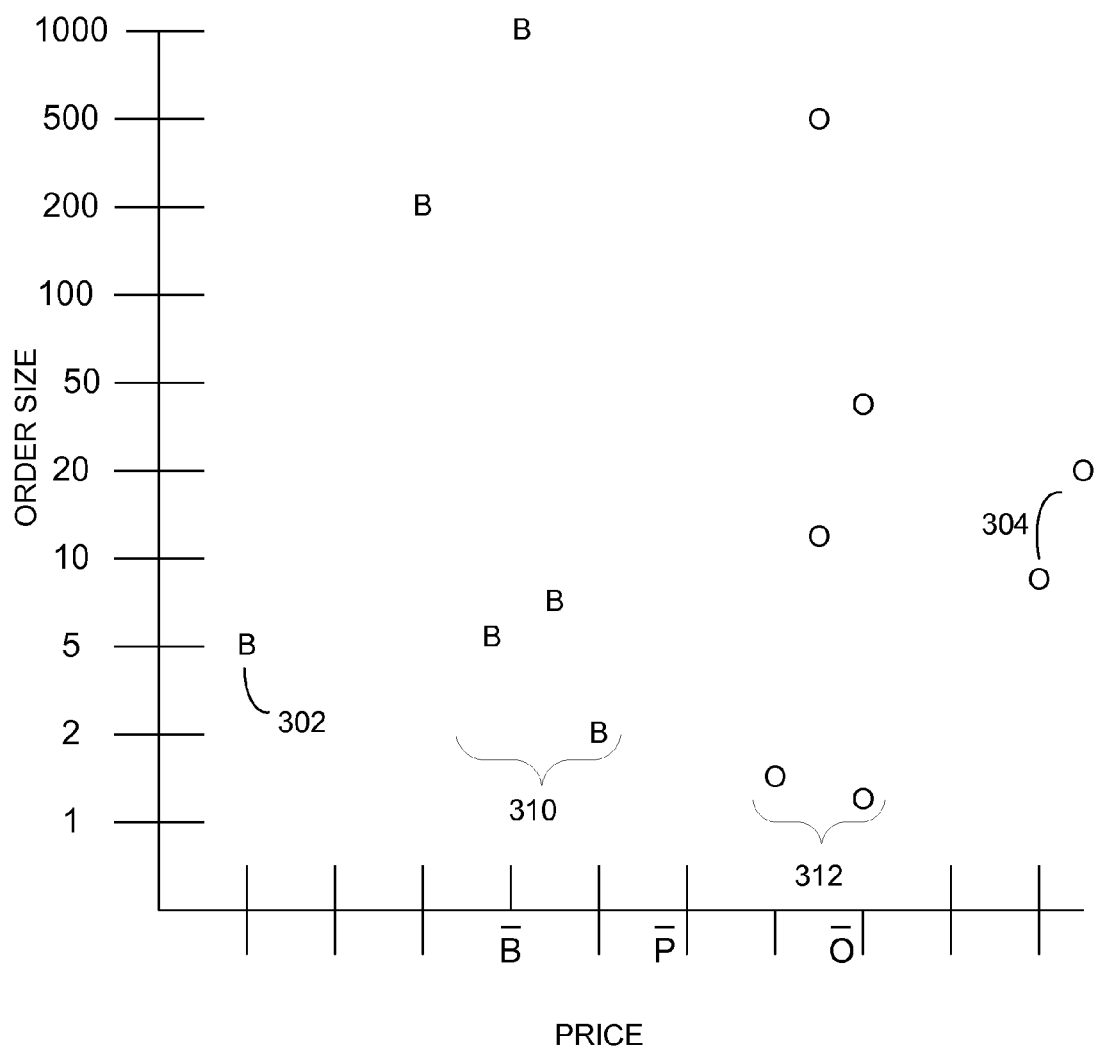
FIG. 3 is a plot of price against size of trading orders.

Referring to FIG. 3, in other cases, computed tradeable price 130 may be calculated as a volume-weighted price over some or all outstanding orders, and/or orders that traded recently. Orders that are identified as "outliers" may be excluded from the calculation. The averaging may be calculated as an arithmetic, geometric, or harmonic mean, or other mean. For example, in FIG. 2, several bids B and offers O are standing in the market. At the close of trading, or at a periodic settlement interval, tradeable price calculation 230 may first identify outlier bids and offers 302, 304 and eliminate them from further consideration so that they will not unduly skew computed price 130. Tradeable price calculation 230 may then compute some weighted-average price of the non-outlier bids 310, and an average price of the non-outlier offers 312, and then compute some "fair" price. Trading rules may specify that mean price is further adjusted based on one or more factors.

In cases where there are at least some bids 110 that are higher than some offers 112, computed tradeable price 130 will generally fall somewhere between the lowest offer and the highest bid. There may be exceptions, such as where the low offer or high bid is from a disfavored party, such as a party who has not established good credit with other counterparties.

Tradeable price calculation 230 may be chosen to avoid allowing one or a small group of orders from having excessive influence on computed tradeable price 130.

Responses to Calculation of Tradeable Price

Referring again to FIG. 2, in some cases, electronic trading system 100 may reprice all, or some portion, of the standing orders at computed tradeable price 130, and execute them against each other with no further confirmation from trader 120, 122. In some cases, a repriced trade may only be executed if the repriced order(s) included a "discretion" price that implied consent to reprice by an amount that covers computed tradeable price 130; in other cases, the rules of the exchange may provide that all orders are subject to repricing and automatic execution 240 with no further confirmation.

In some cases, computed tradeable price 130 may be recomputed dynamically during the trading session for display to traders 120, 122. Traders 120, 122 may then be permitted to adjust their orders, and/or the amount by which they will permit their orders to be repriced, in response to the displayed future tradeable price 130.

In some cases, electronic trading system 100 may seek confirmation 242 from the trader before executing the order as repriced. In some cases, electronic trading system 100 may provide an attribute setting during order entry that allows trader 120, 122 to choose between automatic execution 240 at computed tradeable price 130, or requiring confirmation 242 before executing the trade.

In some cases, electronic trading system 100 may inform all traders 120, 122 with pending orders, and/or all traders 120, 122 who have entered orders and/or expressions of interest during some period of time, of computed tradeable price 130, and/or the volume of unexecuted orders, either to invite new orders, or to invite traders 120, 122 to modify the prices of their orders to computed tradeable price 130. Electronic trading system 100 may execute any such newly-entered or modified orders, to the extent counterparties appear in response to the invitation and as provided by rules of trading system 100.

In some cases, electronic trading system 100 may send invitations 244 to all traders 120, 122 with pending orders, and/or all traders 120, 122 who have entered orders and/or expressions of interest during some time period, to invite them into a conversational dealing mode, with computed tradeable price 130 as a suggested mediated price.

In some cases, electronic trading system 100 may broadcast 244 computed tradable price 130 to all traders 120, 122, to invite orders or negotiation, in any of the modes discussed here, or in other modes as may be appropriate in the circumstances.

In some cases, electronic trading system 100 may otherwise make arrangements, send information or invitations, and/or host negotiations to lead to execution of unexecuted orders.

A trading system may provide any one or more of the above behaviors as its default behavior, as a special type of order with defined trading rules, or as an attribute that a trader 120, 122 may request or decline with respect to individual orders 110, 112, or all orders entered by that trader into a particular market.

In some cases, the behaviors discussed above may take place during an "extended trading day," that may be defined in advance by the rules of trading system 100. In some cases, the period during which trading may occur at computed tradeable price 130 may be limited to a time window; after the time window expires, computed tradeable price 130 may be withdrawn. For example, if the regular market operated by trading system 100 closes at 4 PM of the trading day, the computed price may be circulated at 4:05, to permit negotiation or new orders until 4:15. In other cases, computed trading price 130 may remain posted for some period of time, for example, the entire next trading day, as a price that bidders 120 may propose to offerors 122, etc.

In some cases, electronic trading system 100 may provide that if a trader 120, 122 declines the system's invitation 244 to trade at computed tradeable price 130, reentry of an order or further negotiation will require payment of a fee. Such a "use it or lose it" fee attached to a price 130 may tend to influence the trader to allow the trade to take place at computed tradeable price 130.

Electronic trading system 100 may charge a commission based on the volume of the trade. Alternatively, system 100 may charge a flat monthly fee, a commission based on the size of the trade, or on the size of the gap between bids and offers that were successfully negotiated through the use of computed tradeable price 130, or a fee computed by other rules.

In cases where the highest bid is higher than the lowest offer, system 100 may define trading rules along any of several lines. The system may execute a trade at the computed tradeable price 130, with or without confirmation; or may provide that a trade executes at the price of the later order (thereby giving price preference to earlier orders), or may provide that the trade executes at the price of the earlier order (to reflect later moves in the market price), or may provide that the trader who submitted the earlier order is notified of the later order so that he/she may adjust his/her order to match the later order, or to withdraw the earlier order, or to enter a conversational dealing mode.

Uses of Computed Tradeable Price 130

Trading systems 100 that propose a computed tradeable price 130 may be useful in markets with low liquidity or trading volume, such as unusual assets, commodities with no or limited trading history, or newly-issued financial instruments. Examples might include options on leather hides of a particular grade and size for delivery in Chicago, or futures on ocean freight or tanker rates between the Caribbean and Philadelphia, or new financial derivatives, or derivatives on thinly-traded securities. Market participants 120, 122 who need to control risk may need to be able to control risk by hedging derivatives on such commodities, even if no organized liquid market exists.

Trading systems 100 that propose a computed tradeable price 130 may be able to attract buyers and sellers 120, 122, bidders and offerors, arbitrageurs and hedgers be cause such trading systems 100 may be perceived as a fair market on which to trade illiquid assets. Such trading systems 100 may serve as "incubator markets" to establish liquidity in thinly-traded goods and services, or in which to experiment with new rules for bidding, offering, negotiating and trading.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. In many cases, one feature or group of features may be used separately from the entire apparatus or methods described. Many of those undescribed variations, modifications and variations are within the literal scope of the following claims, and others are equivalent.

The invention claimed is:

1. A method comprising the steps of:
   notifying traders of a computed tradeable price for an object of commerce, the computed tradeable price calculated by a computer in conformance to a standard published to traders in a market for the object of commerce, the standard specifying rules for calculating the tradeable price based on orders received or trades executed in the market;
   executing or negotiating trades, or receiving negotiating offers, based at least in part on the computed tradeable price; and
   before executing a trade, obtaining confirmation from a trader who entered one of the orders involved in a trade to be executed, the order having a price other than the computed tradeable price.

2. A method performed by a computer apparatus, comprising the steps of:
   receiving notification of a computed tradeable price for an object of commerce, the computed tradeable price calculated by a computer operating a market for the object of commerce in conformance to a standard published to traders in the market, the standard specifying rules for calculating the tradeable price based at least in part on orders received and/or trades executed in the market, the market computer being operated by a broker for arranging trades between principals; and
   communicating with other traders in the market to negotiate trades in the object of commerce, or to send negotiating offers for trades in the object of commerce, based at least in part on the computed tradeable price.

3. The method of claim 2, wherein:
   the calculation of computed tradeable price is based at least in part on an execution price of at least one executed trade.

4. The method of claim 2, wherein:
   the calculation of computed tradeable price is based at least in part on price of pending orders, without regard to execution price of any executed trade.

5. The method of claim 2, further comprising the step of:
   accepting a discretion price from a trader for an order, and automatically executing the trade without confirmation after ascertaining that the computed tradeable price is within the discretion price entered by the trader.

6. The method of claim 2, further comprising the step of:
before executing a trade, obtaining confirmation from a trader who entered one of the orders involved in a trade to be executed, the order having a price other than the computed tradeable price.

7. The method of claim 2, further comprising the step of:
inviting traders to negotiate based at least in part on the computed tradeable price, without binding trades to occur at the computed tradeable price.

8. The method of claim 2, wherein:
the notifying of traders of the computed tradeable price occurs after a close of regular trading, and
the negotiating occurs during an extended trading period defined by published rule.

9. The method of claim 2, wherein:
the market computer sends notifications of computed tradeable price throughout the trading day.

10. The method of claim 2, wherein:
a trader receiving a notification of the computed tradeable price or an offer to deal at the computed tradeable price is offered a favorable price or fee level to deal promptly, the favorable price or fee level to be withdrawn after a period of time.

11. The method of claim 2, wherein:
a trader receiving a notification of the computed tradeable price or an offer to deal at the computed tradeable price is offered an opportunity to modify the price of an existing order to match the computed tradeable price.

12. The method of claim 2, wherein:
inviting a trader receiving a notification of the computed tradeable price or receiving an offer to deal at the computed tradeable price into a conversational dealing mode with the computed tradeable price as a suggested mediated price.

13. The method of claim 2, wherein:
computation of computed tradeable price includes the step of determining whether a low offer or high bid is from a disfavored party.

14. One or more computer apparatus with nontransitory memory containing programs to cause the computer(s) to:
transmit notification of a computed tradeable price for an object of commerce from a market computer being operated by a broker for arranging trades between principals to a trader's computer, the computed tradeable price calculated in conformance to a standard published to traders in the market, the standard specifying rules for calculating the tradeable price based at least in part on orders received and/or trades executed in the market; and
communicate negotiating messages among traders in the market to negotiate trades in the object of commerce, or to send negotiating offers for trades in the object of commerce, based at least in part on the computed tradeable price.

15. The apparatus of claim 14, the programs being further programmed to cause the computer(s) to:
accept a discretion price from a trader for an order, and
automatically execute the trade without confirmation after ascertaining that the computed tradeable price is within the discretion price entered by the trader.

16. The apparatus of claim 14, the programs being further programmed to cause the computer(s) to:
before executing a trade, obtaining confirmation from a trader who entered one of the orders involved in a trade to be executed, the order having a price other than the computed tradeable price.

17. The apparatus of claim 14, the programs being further programmed to cause the computer(s) to:
invite traders to negotiate based at least in part on the computed tradeable price, without binding trades to occur at the computed tradeable price.

18. The apparatus of claim 14, the programs being further programmed to cause the computer(s) to:
offer to a trader receiving a notification of the computed tradeable price or receiving an offer to deal at the computed tradeable price a favorable price or fee level to deal promptly, and to withdraw the favorable price or fee level after a period of time.

19. The apparatus of claim 14, the programs being further programmed to cause the computer(s) to:
offer to a trader receiving a notification of the computed tradeable price or receiving an offer to deal at the computed tradeable price an opportunity to modify the price of an existing order to match the computed tradeable price.

20. The apparatus of claim 14, the programs being further programmed to cause the computer(s) to:
invite a trader receiving a notification of the computed tradeable price or receiving an offer to deal at the computed tradeable price into a conversational dealing mode with the computed tradeable price as a suggested mediated price.

21. The apparatus of claim 14, the programs being further programmed to cause the computer(s) to:
compute the computed tradeable price based at least in part on determining whether a low offer or high bid is from a disfavored party.

* * * * *